(No Model.)
J. J. MOSER.
WELL STRAINER.
No. 501,655. Patented July 18, 1893.
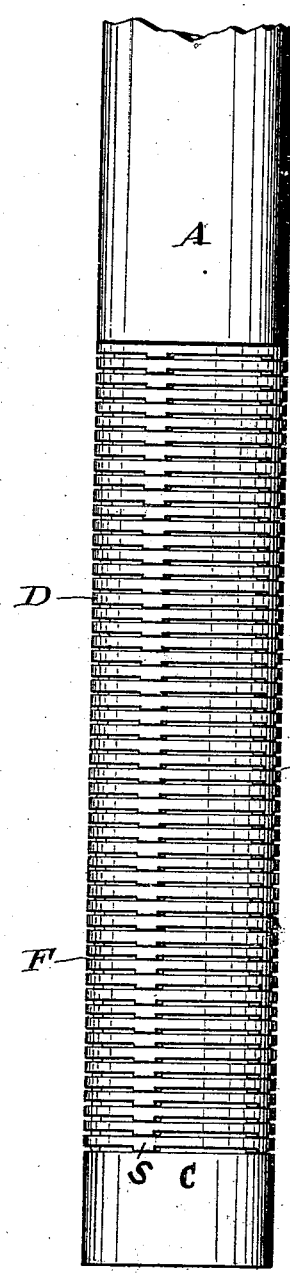
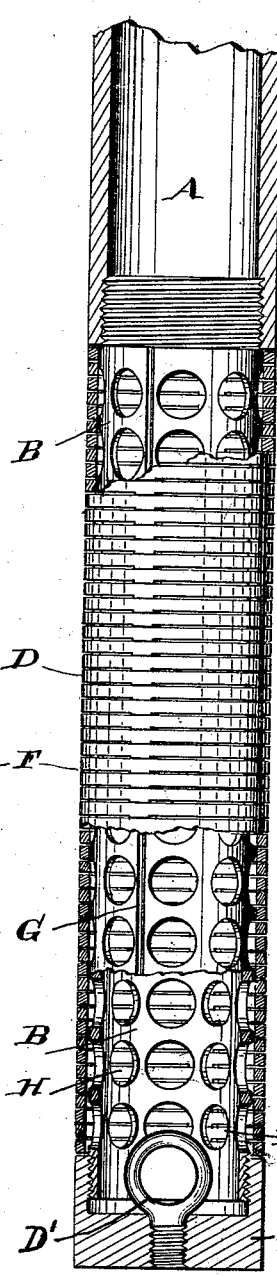
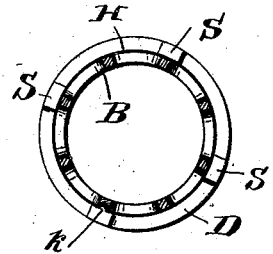
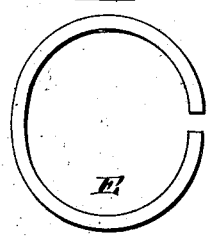
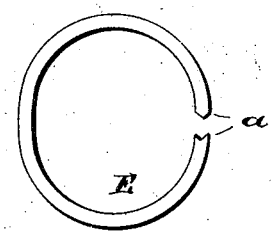
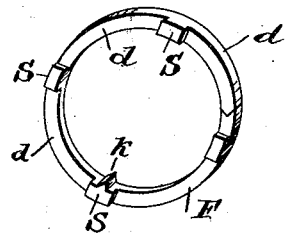
Attest:
A. Pleapen
M. Britton
Joseph J. Moser
Inventor

UNITED STATES PATENT OFFICE.

JOSEPH J. MOSER, OF WEST COVINGTON, KENTUCKY.

WELL-STRAINER.

SPECIFICATION forming part of Letters Patent No. 501,655, dated July 18, 1893.

Application filed July 23, 1892. Serial No. 441,051. (No model.)

*To all whom it may concern:*

Be it known that I, JOSEPH J. MOSER, a citizen of the United States, residing in the city of West Covington, in the county of Kenton and State of Kentucky, have invented certain new and useful Improvements in Sand-Strainers for Deep Wells, of which the following is a specification.

The object of my invention is to produce a strainer for deep wells which shall be cheap in manufacture, simple in construction and durable and efficient in use. The object of all this class of strainers is to prevent fine particles of sand from entering the well tube as they would have a disastrous effect upon the machinery. The strainers now in use are short lived. It is very expensive to replace them. The strainers in which the perforations are sawed, easily wear out, as the perforations are sawed through a very thin shell, the inner part of the shell or well tube opposite to where the perforations are intended to be cut being milled to permit the saw to penetrate the metal which is very tough and hard. The strainers made of separate segmental pieces are too expensive and intricate, and too apt to get out of order, there being so many segmental pieces that it is next to impossible to get them in working order.

In the accompanying drawings forming part of this specification:—Figure 1— is a view in elevation of my improved strainer. Fig. 2— is a partial longitudinal section; Fig. 3— a top view of one of the rings or annular pieces which make up the strainer in part, the well tube being shown in section. Fig. 4— is a plan view of one of the strainer rings just after it has been cut; Fig. 5— a plan view of the same ring after its ends have been finished, and Fig. 6— a perspective view of the finished ring after it has been placed in compressing and finishing dies.

The frame of the strainer is composed of the tubes A and B, the tube B being preferably perforated, as shown. Tube A is screw threaded, as shown, and fits a screw thread on the tube B. A cap C is screwed onto the end of the tube B, as shown in Fig. 2. A bail B' is provided in the cap C as shown. By this means the strainer can be withdrawn from the well.

The outer shell D or strainer proper, is composed of a series of rings of the form shown. They are placed one upon the other and together form the sieve of the device. These rings may be made of any shape or form, of any size and of any desired material.

In manufacturing I make these rings as follows: I take a square piece of wire of hard material and form it into a spiral shape. Blanks as shown in Fig. 4 are then cut from this spiral piece. These blanks are then placed under cutting dies and the ends are formed, as shown at $a$, $a$, Fig. 5. The blank thus formed is placed in compressing and stamping dies and the perfect ring F is formed (see Fig. 6). The compressing dies unite the joint and make a solid ring and the stamping dies form the depressions $d$, leaving the shoulders $s$, between said depressions. On one of the shoulders $s$, or at any other convenient point, in the ring, I form a lug or key $k$. This key $k$ fits a recess G in the shell B. Thus the rings are held in proper position.

The rings F are placed on the tube or shell B, as follows: The cap $c$ is first screwed onto the lower end of shell or tube B, the tube A being removed. The rings F are then slipped to place over the shell B, from the top, one above and upon the other until the necessary number have thus been slipped to place, thus slight openings are left between the rings, as shown. These openings can be made as slight as desired. The rings are then clamped into rigid position by means of the tube A being screwed down upon them and the shell B, as shown. Any lateral motion of the rings is prevented by the lugs or keys $k$ fitting the opening or recess G.

The tubes A and B and cap D may be made tapering in shape if desired so that they can be more easily recovered or withdrawn from the well. They may be made of any material. Openings H may be made of any size and placed in parallel or irregular columns, as desired. The rings F may be formed in any desired shape and the depressions formed in them in any desired manner. If desired the rings may be made without depressions and be separated from each other in some other desired manner, or by any other means.

What I claim as new and of my invention, and desire to secure by Letters Patent, is—

A strainer for deep wells, composed of a series of rings F, one placed above the other, said rings having depressions in their faces at $d$, shoulders $s$, and keys $k$, tube B, having recess G caps D and tube A, substantially as set forth.

JOSEPH J. MOSER.

Witnesses:
W. S. HARTLEY,
W. HADDOCK.